US012759357B2

(12) United States Patent
Lee et al.

(10) Patent No.: US 12,759,357 B2
(45) Date of Patent: Oct. 13, 2026

(54) FLYING CAR CAPABLE OF VERTICAL TAKEOFF AND LANDING ON GROUND/WATER

(71) Applicants: Chun Hyeong Lee, Iksan-si (KR); Seong Chan Lee, Iksan-si (KR); Ga Eun Lee, Iksan-si (KR)

(72) Inventors: Chun Hyeong Lee, Iksan-si (KR); Seong Chan Lee, Iksan-si (KR); Ga Eun Lee, Iksan-si (KR)

( * ) Notice: Subject to any disclaimer, the term of this patent is extended or adjusted under 35 U.S.C. 154(b) by 0 days.

(21) Appl. No.: 18/875,156

(22) PCT Filed: Feb. 10, 2023

(86) PCT No.: PCT/KR2023/002009
§ 371 (c)(1),
(2) Date: Dec. 15, 2024

(87) PCT Pub. No.: WO2023/243802
PCT Pub. Date: Dec. 21, 2023

(65) Prior Publication Data
US 2025/0381812 A1 Dec. 18, 2025

(30) Foreign Application Priority Data
Jun. 16, 2022 (KR) ........................ 10-2022-0073478

(51) Int. Cl.
*B60F 5/02* (2006.01)
*B60F 3/00* (2006.01)
(Continued)

(52) U.S. Cl.
CPC .................. *B60F 5/02* (2013.01); *B60F 3/00* (2013.01); *B60F 5/003* (2013.01); *B60P 3/341* (2013.01);
(Continued)

(58) Field of Classification Search
CPC .. B60F 5/002; B60F 5/02; B60P 3/341; B60P 3/54; B64C 3/54; B64C 29/0008; B64C 35/00; B64C 37/00
See application file for complete search history.

(56) References Cited

U.S. PATENT DOCUMENTS 1,513,227 A * 10/1924 Cornelius ............... B60P 3/341
135/88.13
4,223,939 A * 9/1980 Beggs ..................... B60P 3/341
296/26.11
(Continued)

FOREIGN PATENT DOCUMENTS

CN 107757273 A 3/2018
DE 3911740 A * 10/1990 .............. B60P 3/341
(Continued)

OTHER PUBLICATIONS

International Search Report for PCT/KR2023/002009 mailed May 2, 2023 from Korean Intellectual Property Office.

*Primary Examiner* — Michael H Wang
(74) *Attorney, Agent, or Firm* — Revolution IP, PLLC

(57) ABSTRACT

The present invention relates to a flying car capable of vertical takeoff and landing on the ground/water, wherein the flying car includes: a body having a predetermined volume; a wing provided outside the body; and a propulsion module connected to the body and provided to generate propulsive force for flying, wherein the propulsion module is provided to be operated on the basis of drone-type control.

2 Claims, 10 Drawing Sheets

(51) Int. Cl.

| | |
|---|---|
| ***B60F 5/00*** | (2006.01) |
| ***B60P 3/34*** | (2006.01) |
| ***B64C 3/54*** | (2006.01) |
| ***B64C 29/00*** | (2006.01) |
| ***B64C 35/00*** | (2006.01) |
| ***B64C 37/00*** | (2006.01) |

(52) U.S. Cl.
CPC ............ *B64C 3/54* (2013.01); *B64C 29/0008* (2013.01); *B64C 35/00* (2013.01); *B64C 37/00* (2013.01)

(56) References Cited

U.S. PATENT DOCUMENTS

| | | | | | |
|---|---|---|---|---|---|
| 4,504,049 | A * | 3/1985 | Straub | B60P 3/341 | 296/26.02 |
| 4,579,297 | A * | 4/1986 | Ayoola | B60F 3/00 | 244/50 |
| 7,866,610 | B2 * | 1/2011 | Bousfield | B64U 30/12 | 244/46 |
| 8,827,200 | B2 * | 9/2014 | Radu | B60F 5/02 | 244/23 B |
| 9,505,282 | B2 * | 11/2016 | Hu | B63B 5/24 | |
| 2006/0016930 | A1 * | 1/2006 | Pak | B64C 29/0033 | 244/12.4 |
| 2011/0042507 | A1 * | 2/2011 | Seiford, Sr. | B64C 29/0025 | 244/2 |
| 2012/0048989 | A1 * | 3/2012 | Eames | B60F 5/02 | 244/2 |
| 2016/0272314 | A1 * | 9/2016 | Radu | B60F 5/02 | |
| 2022/0176863 | A1 * | 6/2022 | Kremsreiter | B32B 5/263 | |

FOREIGN PATENT DOCUMENTS

| | | | | |
|---|---|---|---|---|
| FR | 2967109 | A1 * | 5/2012 | B60P 3/341 |
| JP | 2006-051841 | A | 2/2006 | |
| KR | 10-1845964 | B1 | 4/2018 | |
| KR | 10-2022-0063857 | A | 5/2022 | |
| WO | 2009-096058 | A1 | 8/2009 | |

* cited by examiner

FLYING CAR CAPABLE OF VERTICAL TAKEOFF AND LANDING ON GROUND/WATER

CROSS REFERENCE TO PRIOR APPLICATIONS

This application is a National Stage Application of PCT International Patent Application No. PCT/KR2023/002009 filed on Feb. 10, 2023, under 35 U.S.C. § 371, which claims priority to Korean Patent Application No. 10-2022-0073478 filed on Jun. 16, 2022, which are all hereby incorporated by reference in their entirety.

TECHNICAL FIELD

The present invention relates to a flying car capable of vertical takeoff and landing on the ground/water, and more particularly, to a flying car capable of vertical takeoff and landing on the ground/water, which may perform vertical takeoff and landing and may be easily controlled in a drone control manner.

BACKGROUND ART

Airplanes according to the related art generally have a size greater than a certain volume and require a runway for takeoff and landing. However, in recent years, airplanes that have a smaller size and are capable of vertical takeoff and landing by rotating a propeller or the like that provides a propulsive force have been appearing.

However, in the case of a small airplane, a relatively large space is also required for landing or storage due to the size of the propeller. Further, a small airplane also requires many instrument panels and control sticks to control operation thereof, and it is difficult for ordinary people to manipulate the airplane.

DESCRIPTION OF THE INVENTION

Technical Problem

The present invention is directed to providing a flying car capable of vertical takeoff and landing on the ground/water, which is capable of effective vertical takeoff and landing.

Further, the present invention is also directed to providing a flying car capable of vertical takeoff and landing on the ground/water, which is controlled in a drone control manner and thus is easy to control.

Further, the present invention is also directed to providing a flying car capable of vertical takeoff and landing on the ground/water, which is capable of water driving and ground driving.

Further, the present invention is also directed to providing a flying car capable of vertical takeoff and landing on the ground/water, which is capable of providing sufficient space for camping.

Technical Solution

One aspect of the present invention provides a flying car capable of vertical takeoff and landing on the ground/water, the flying car including a body having a preset volume, a wing provided outside the body, and a propulsion module connected to the body and provided to form a propulsive force for flight, wherein the propulsion module is provided to be operated based on drone-type control.

Further, the propulsion module may include a support shaft provided such that a longitudinal direction faces a width direction and connected to the body to be rotatable about the longitudinal direction, a connection member located at an end of the support shaft and provided to have a preset length in a direction perpendicular to the support shaft, and a propulsion member provided as a plurality of propulsion members in a longitudinal direction of the connection member and provided to generate a propulsive force.

Further, the wing may have a variable length.

Further, the flying car may further include a buoyancy boat that is connected to a lower portion of the body, provides a buoyant force by which the flying car floats on the water, and is provided to be rotatable about the body, wherein a chair provided for a user to sit on and provided to be rotatable about the body in a direction opposite to rotation of the body in correspondence with the rotation of the body may be provided inside the body.

Further, the flying car may further include a buoyancy boat that is connected to a lower portion of the body and provides a buoyant force by which the flying car floats on the water and a flight assistance module accommodated in a space formed inward at a rear end of the buoyancy boat and provided to be withdrawn rearward, wherein the flight assistance module may include an auxiliary body part having a present length in a front-rear direction and having a preset width in a left-right direction, horizontal tail wings located on both a left side and a right side of a rear end of the auxiliary body part and having variable lengths, and a vertical tail wing located at a center of the rear end of the auxiliary body part.

Further, the flight assistance module may be provided in a tube mat structure, and rails may be provided on both a left side and a right side of an upper surface of the auxiliary body part, and a tent member may be provided to be stored inside the body, has a bellows structure, and is provided to be movable along the rails, and when the flight assistance module is covered, a camping space is formed to enable camping.

Advantageous Effects

According to an embodiment of the present invention, a flying car capable of vertical takeoff and landing on the ground/water, which is capable of effective vertical takeoff and landing, may be provided.

Further, according to the embodiment of the present invention, a flying car capable of vertical takeoff and landing on the ground/water, which is controlled in a drone control manner and thus is easy to control, may be provided.

Further, according to the embodiment of the present invention, a flying car capable of vertical takeoff and landing on the ground/water, which is capable of water driving and ground driving, may be provided.

Further, according to the embodiment of the present invention, a flying car capable of vertical takeoff and landing on the ground/water, which is capable of sufficiently providing a space for camping, may be provided.

BEST MODE

A flying car capable of vertical takeoff and landing on the ground/water according to an embodiment of the present invention includes a body having a predetermined volume, a wing provided outside the body, and a propulsion module connected to the body and provided to generate a propulsive force for flying, wherein the propulsion module is provided to be operated based on drone-type control.

Modes of the Invention

Hereinafter, exemplary embodiments of the present invention will be described in detail with reference to the accompanying drawings. However, the technical spirit of the present invention is not limited to the embodiments described herein and may be embodied in other forms. Rather, the embodiments introduced herein are provided to ensure that the disclosed content may be thorough and complete and that the spirit of the present invention may be sufficiently conveyed to those skilled in the art.

In the specification, when it is mentioned that a first component is on a second component, this means that the first component may be directly formed on the second component or a third component may be interposed therebetween. Further, in the accompanying drawings, thicknesses of films and areas are exaggerated in order to describe the technical content effectively.

Further, in various embodiments of the specification, terms such as "first," "second," and "third" are used to describe various components, but these components should not be limited by these terms. These terms are merely used to distinguish any component from another component. Thus, a component mentioned as a first component in an embodiment may be referred to as a second component in another embodiment. Each embodiment described and illustrated herein also includes a complementary embodiment thereof. Further, in the specification, the meaning of the term "and/or" includes at least one of the components listed before and after.

In the specification, singular expressions include plural expressions unless the context clearly indicates otherwise. Further, terms such as "include" or "have" are intended to specify the existence of features, numbers, steps, components, or a combination thereof described in the specification and should not be understood as excluding the existence or addition of one or more other features, numbers, steps, components, or combinations thereof. Further, in the specification, the meaning of the term "connection" includes both indirect connection and direct connection of a plurality of components.

Further, in describing the present invention below when it is determined that detailed description of a related known function or configuration may make the subject matter of the present invention unclear, the detailed description thereof will be omitted.

Figure 1:
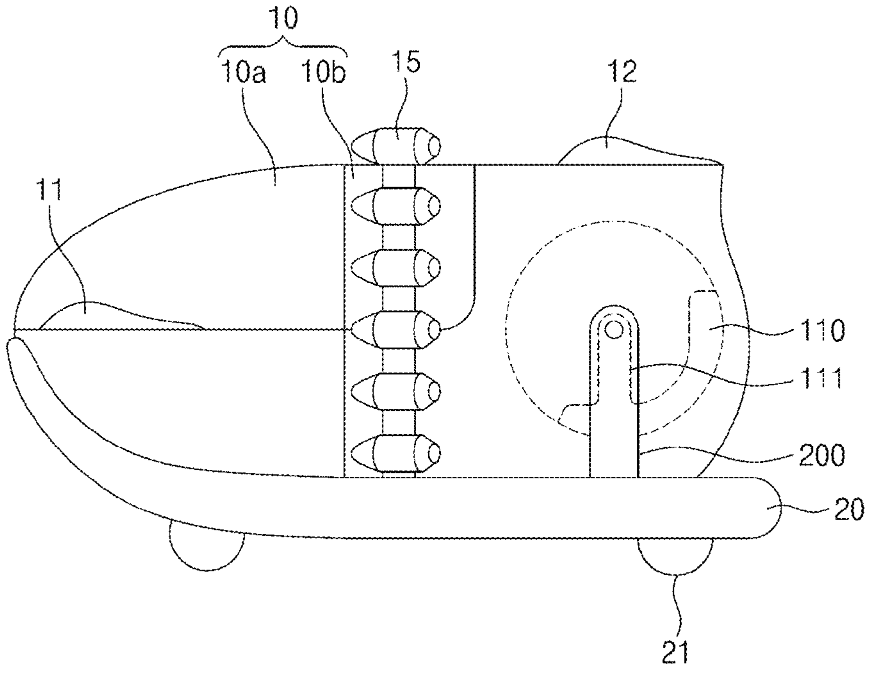
FIG. 1 is a view illustrating a flying car capable of vertical takeoff and landing on the ground/water according to an embodiment of the present invention.
Figure 2:
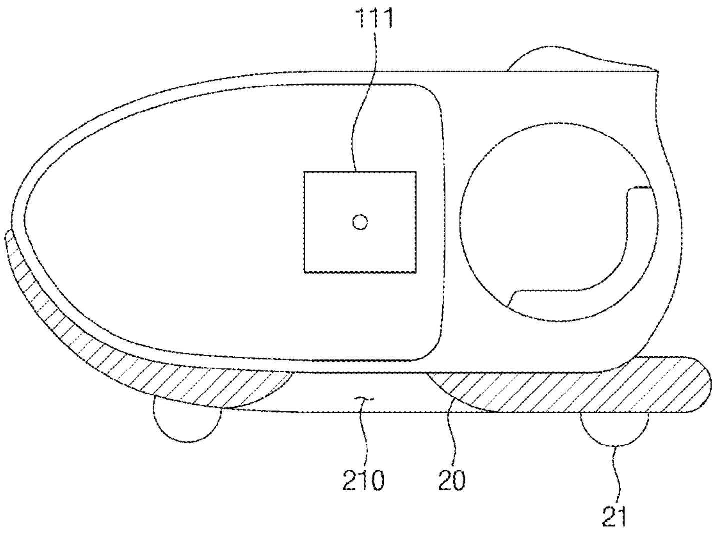
FIG. 2 is a longitudinal cross-sectional view in a longitudinal direction of the flying car capable of vertical takeoff and landing on the ground/water according to the embodiment of the present invention.
Figure 3:
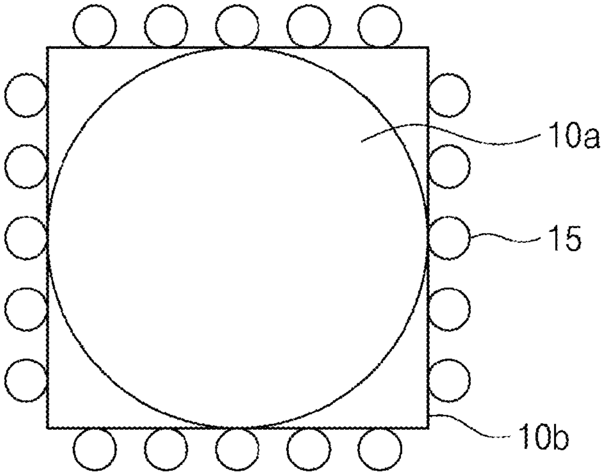
FIG. 3 is a view illustrating a schematic shape of a body and an arrangement state of a propulsion module when viewed from the front.

FIG. 1 is a view illustrating a flying car capable of vertical takeoff and landing on the ground/water according to an embodiment of the present invention, FIG. 2 is a longitudinal cross-sectional view in a longitudinal direction of the flying car capable of vertical takeoff and landing on the ground/water according to the embodiment of the present invention, and FIG. 3 is a view illustrating a schematic shape of a body and an arrangement state of a propulsion module when viewed from the front.

Referring to FIGS. 1 to 3, a flying car 1 capable of vertical takeoff and landing on the ground/water according to an embodiment of the present invention includes a body 10, a propulsion module 15, and a buoyancy boat 20.

The body 10 forms a boarding space which has a preset volume and which a user may board. Further, the boarding space provided inside the body 10 may form a spare space in which the user may rest after items are loaded or bedding is unfolded while the user is boarded. An outer shape of the body 10 may be provided in a streamlined structure to facilitate flight and reduce friction during the flight. The body 10 includes a front body portion **10*a* and a rear body portion 10*b*. The front body portion 10*a* may provide a front area of the body 10, may be provided in a streamlined structure, and may have a circular perimeter in a direction perpendicular to a longitudinal direction. The rear body portion 10*b* may provide a rear area of the body 10** and may have a quadrangular perimeter in the direction perpendicular to the longitudinal direction.

Wings 11 and 12 for the flight are provided outside the body 10. The wings 11 and 12 include a main wing 11 and a horizontal tail wing 12. The main wing 11 is provided in a front area of the body 10 and is provided to horizontally extend outward from the body 10. The horizontal tail wing 12 is provided in a rear area of the body 10 and is provided to horizontally extend outward from the body 10. Further, a vertical tail wing may be provided in a rear area of the body 10 and may vertically extend upward.

The propulsion module 15 is connected to the body 10 and is provided to generate a propulsive force for the flight. A plurality of propulsion modules 15 are arranged to be spaced a preset distance from each other along an outer perimeter of the body 10. The propulsion module 15 may be located on an outer perimeter of a central area of the body 10 in the longitudinal direction. The propulsion module 15 is located in the rear body portion 10*b*. The propulsion modules 15 may be arranged around the body 10 to be symmetrical to each other. The propulsion module 15 may be a jet engine, an electric ducted fan (EDF), or the like. The propulsion module 15 is embodied to be used for a drone and is operated based on drone-type control. The propulsion module 15 may be controlled through a remote controller or a controller located inside the body 10.

The buoyancy boat 20 is provided to be connected to a lower portion of the body 10 and provides a buoyant force to float in water. The buoyancy boat 20 is made of a material capable of providing a sufficient buoyant force, and at the same time, having flight-capable strength. According to the embodiment, the buoyancy boat 20 may be made of carbon fiber.

The buoyancy boat 20 may be provided to be symmetrical in a left-right direction of the body 10 over a front area to a rear area under the body 10. Accordingly, when the flying car 1 capable of vertical takeoff and landing on the ground/water according to the embodiment of the present invention is located on a water surface, the flying car 1 may stably float by the buoyant force provided by the buoyancy boat 20.

Further, an opening part 210 through which a portion in which the propulsion module 15 is located vertically passes is formed in an inner central area of the buoyancy boat 20. Accordingly, some of the plurality of propulsion modules 15, which are located on a lower side of the body 10, are exposed to a lower area of the buoyancy boat 20. When the flying car 1 capable of vertical takeoff and landing on the ground/water is located on the water surface, the propulsion module 15 located under the body 10 is located underwater. Further, the flying car 1 capable of vertical takeoff and landing on the ground/water according to the embodiment of the present invention may travel on the water surface by the propulsive force of the propulsion module 15 located underwater. In this case, the propulsion module 15 is provided as an EDF and is provided to generate the propulsive force underwater.

Wheels 21 may be located under the buoyancy boat 20. The wheels 21 may be located in a lower front area and a rear area of the buoyancy boat 20. For example, the wheels 21 may be provided as a three-wheel type or a four-wheel type. At least one of the wheels 21 may be provided in a structure in which an in-wheel motor that provides power for traveling is embedded. Accordingly, the flying car 1 capable of vertical takeoff and landing on the ground/water according to the embodiment of the present invention may travel through the wheels 21 while located on the ground.

Figure 4:
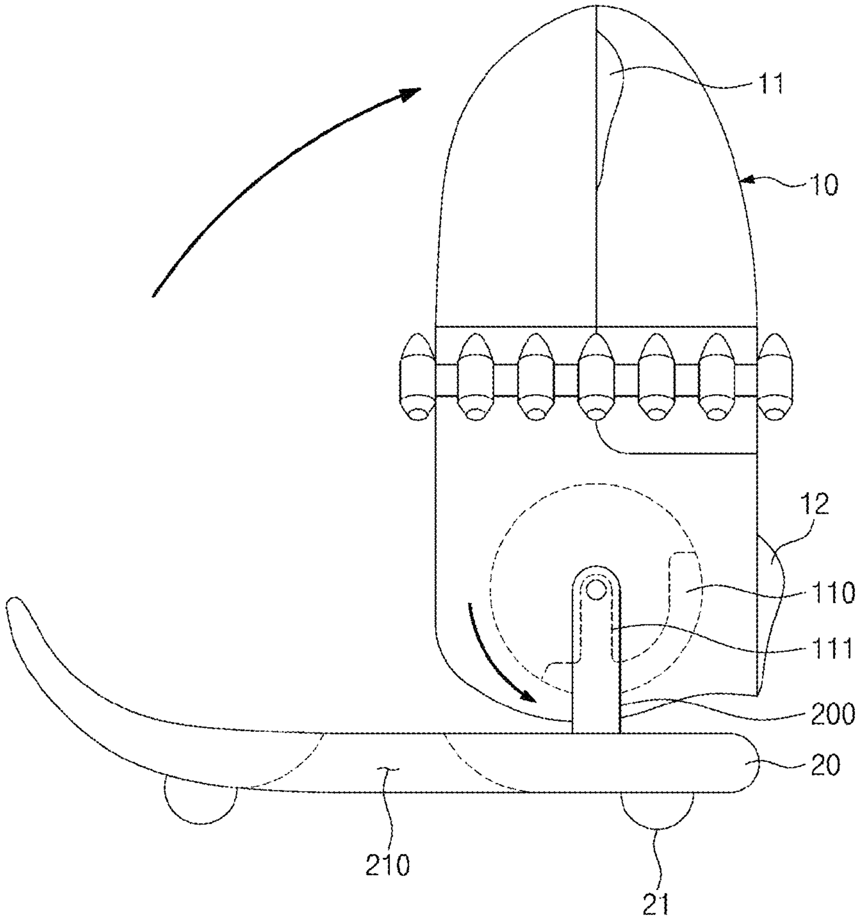
FIG. 4 is a view illustrating a state in which the body is erected with respect to a buoyancy boat.

FIG. 4 is a view illustrating a state in which the body is vertically erected with respect to the buoyancy boat.

Referring to FIG. 4, a rear end portion of the body 10 and a rear end portion of the buoyancy boat 20 are provided to be rotatable about a left-right direction. That is, a rotation connection part 200 is provided at the rear end portion of the buoyancy boat 20. The rotation connection part 200 extends a preset length upward from the buoyancy boat 20 and provides an axis on which the body 10 may rotate relative to the buoyancy boat 20. The body 10 may rotate relative to the buoyancy boat 20 and may be vertically erected such that a longitudinal direction thereof faces a vertical direction. Further, the boarding space formed inside the body 10 and a chair 110 which is located in the boarding space and on which the user sits may be provided to be rotatable about the rotation connection part 200. In detail, the chair 110 is provided with an auxiliary connection part 111. The auxiliary connection unit 111 has the same axis as the rotation connection part 200. Accordingly, the chair 110 may rotate about the rotation connection part 200.

Due to the above-described structure, the chair 110 may rotate with respect to the buoyancy boat 20 in a direction opposite to a rotational direction of the body 10 simultaneously while the body 10 rotates. When the body 10 rotates, the chair 110 may rotate in the direction opposite to the rotational direction of the body 10 in correspondence with a rotational angle of the body 10, and thus the boarding space and the chair 110 may be maintained in a form located on a horizontal plane.

Further, a storage box 111 that stores an object may be provided in the spare space. The storage box 111 may be provided to be rotatable about the body 10 in the same manner as the chair 110. Thus, when the body 10 rotates, the storage box 111 may rotate in the direction opposite to the rotational direction of the body 10 in correspondence with the rotational angle of the body 10, and thus the storage box 111 may be maintained in a form located on the horizontal plane. Accordingly, even when the body 10 rotates, objects stored in in the storage box 111 may be prevented from spilling out of the storage box 111.

When the propulsion module 15 operates while the body 10 is erected, the propulsive force faces upward, and thus the flying car 1 takes off. Further, when the flying car 1 takes off from the ground, the buoyancy boat 20 rotates relative to the body 10 and comes into close contact with the body 10. In this state, the body 10 is erected perpendicular to the ground, an occupant in the chair 110 looks forward, and the occupant may secure his/her view through an opening part 210.

Figure 5:
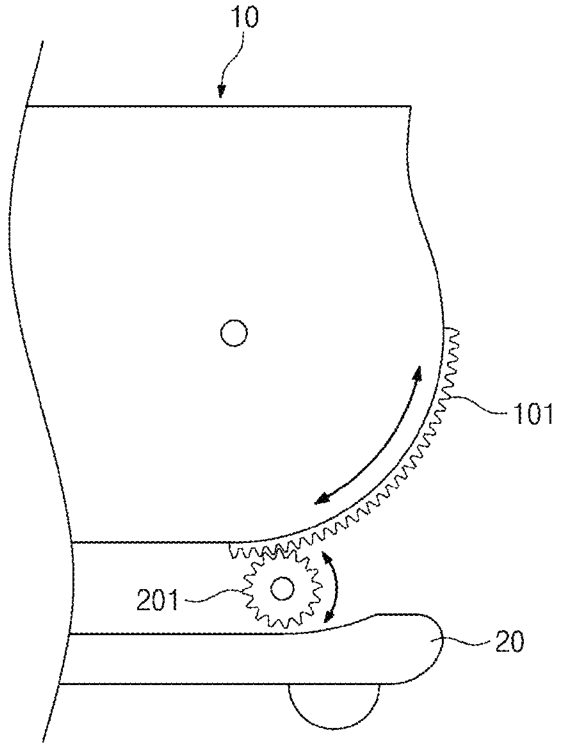
FIG. 5 is a view illustrating a driving module for rotating the body and the buoyancy boat relative to each other.

FIG. 5 is a view illustrating a driving module for rotating the body and the buoyancy boat relative to each other.

Referring to FIG. 5, the body 10 and the buoyancy boat 20 rotate relative to each other by power provided by driving modules 101 and 201. For example, the driving module 101 may be provided with a rack 101 provided in a curved shape on an outer surface of the rear end portion of the body 10 and a gear 201 that rotates in conjunction with the rack 101 and is connected to the buoyancy boat 20. As another example, the driving module 101 may be a hydraulic cylinder having a variable length as opposite ends thereof are connected to the rear end portion of the body 10 and the buoyancy boat 20.

Figure 6:
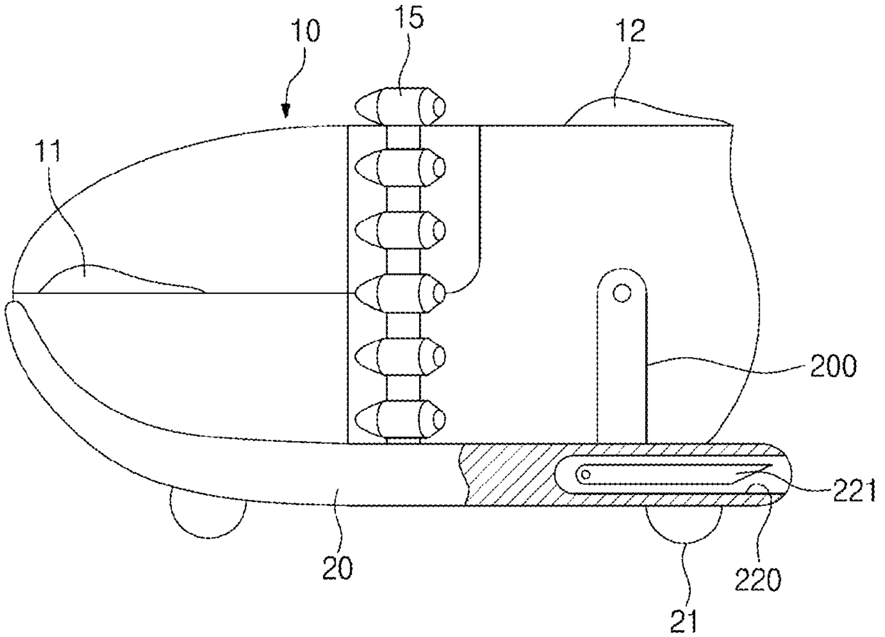
FIG. 6 is a view illustrating an inclined board located inside a rear end portion of the buoyancy boat.
Figure 7:
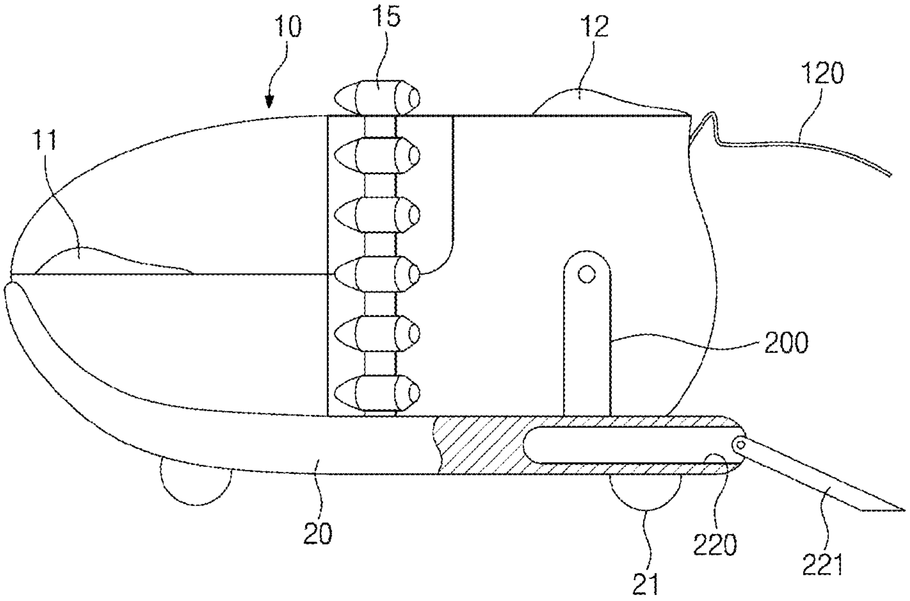
FIG. 7 is a view illustrating a state in which a rear side of the body is open and a current state is switched to a wheelchair boarding mode.

FIG. 6 is a view illustrating an inclined board located inside a rear end portion of the buoyancy boat, and FIG. 7 is a view illustrating a state in which a rear side of the body is open and a current state is switched to a wheelchair boarding mode.

Referring to FIGS. 6 and 7, the flying car 1 capable of vertical takeoff and landing on the ground/water according to the embodiment of the present invention may be provided to be equipped with a wheelchair. In detail, a rear door 120 is provided at the rear end portion of the body 10 for the body 10 to be opened. Further, a board accommodation space 220 may be formed at the rear end portion of the buoyancy boat 20, and an inclined board 221 withdrawn in a rearward direction may be provided in the board accommodation space 220.

When the rear door 120 is opened while the inclined board 221 is withdrawn rearward from the board accommodation space 220 and is then lowered toward the ground, the user in the wheelchair may also board the flying car 1 capable of vertical takeoff and landing on the ground/water. In this case, the chair 110 may be separated, and the wheelchair may be fixed to an inside of the body 10 instead of the chair 110. Accordingly, when the body 10 is erected, the wheelchair may rotate about the body 10 like the chair 110 and may be maintained on the horizontal plane.

Figure 8:
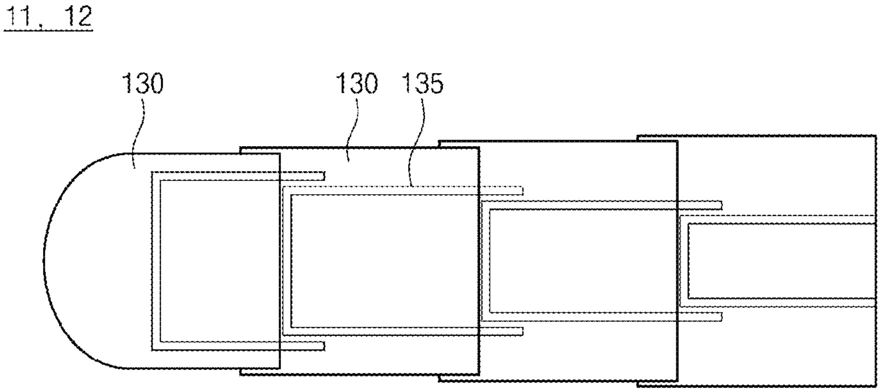
FIG. 8 is a view illustrating a structure of a wing having a variable length.

FIG. 8 is a view illustrating a structure of a wing having a variable length.

Referring to FIG. 8, the wings 11 and 12 of the flying car 1 capable of vertical takeoff and landing on the ground/water are provided with variable lengths. For example, a wing housing 130 may be provided in a telescopic structure and may be provided in a multi-stage structure in which a portion thereof located away from the body 10 is inserted into a portion thereof located relatively close to the body 10. Accordingly, in a landed state on the water surface or the ground or in a traveling state on the water surface or the ground, the lengths of the wings 11 and 12 may be shortened. Further, the flying car 1 capable of vertical takeoff and landing on the ground/water may take off from the ground in a state in which the wings 11 and 12 are shortened and then may fly after the wings 11 and 12 become longer in the air.

A wing frame 135 is provided inside the wing housing 130. The wing frame 135 has a slidable ladder structure and is provided to be mutually slid so that a length thereof is increased or decreased. The wing frame 135 may be provided in a structure in which a width of a ladder increases stepwise as a distance from the body 10 increases. Unlike this, the wing frame 135 may be provided in a structure in which the width of the ladder decreases stepwise as the distance from the body 10 increases. Further, the wing frame 135 may be provided to have a structure similar to a foldable antenna through a carbon fiber barrel pipe and may have a variable length.

Figure 9:
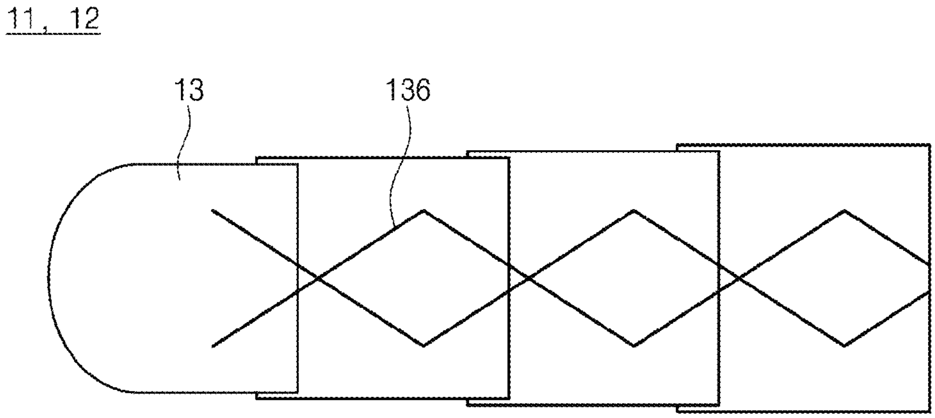
FIG. 9 is a view illustrating a structure of a wing having a variable length according to another embodiment.

FIG. 9 is a view illustrating a structure of a wing having a variable length according to another embodiment.

Referring to FIG. 9, the wing housing 130 is provided in a telescopic structure and is provided such that a length thereof may be increased or decreased. A wing frame 136 is located inside the wing housing 130. The wing frame 136 is provided in a Caesars structure and is provided in a structure in which a length thereof varies to correspond to the wing housing 130. One end of the wing frame 136 may be coupled to the body 10, and an opposite end of the wing frame 136 may be coupled to an inner end of the wing housing 130 away from the body 10. Thus, when the length of the wing frame 136 is adjusted, the length of the wing housing 130 may be adjusted together.

Figure 10:
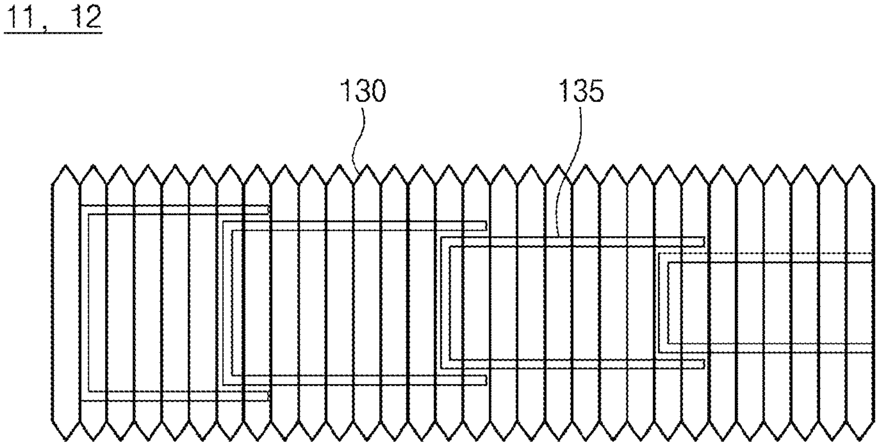
FIG. 10 is a view illustrating a structure of a wing having a variable length according to yet another embodiment.

FIG. 10 is a view illustrating a structure of a wing having a variable length according to yet another embodiment.

Referring to FIG. 10, the wing housing 130 may be integrally provided but may be provided in a stretchable structure, and thus the length thereof may be variable. As an example, the wing housing 130 may be provided in a bellows structure having a variable length through a corrugated structure. The wing frame 135 is provided inside the wing housing 130. The wing frame 135 has a slidable ladder structure and is provided to be mutually slid so that the length thereof is increased or decreased.

Figure 11:
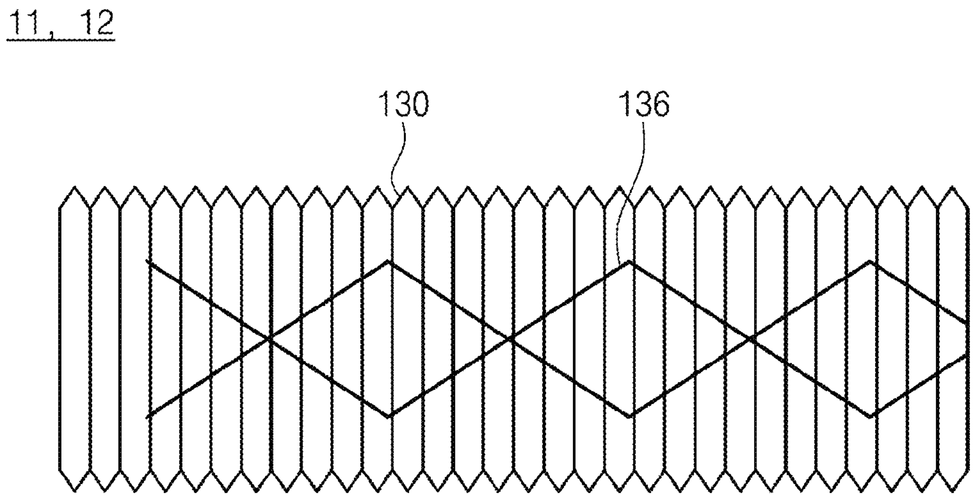
FIG. 11 is a view illustrating a structure of a wing having a variable length according to yet another embodiment.

FIG. 11 is a view illustrating a structure of a wing having a variable length according to yet another embodiment.

Referring to FIG. 11, the wing housing 130 may be integrally provided but may be provided in a stretchable structure, and thus the length thereof may be variable. As an example, the wing housing 130 may be provided in a bellows structure having a variable length through a corrugated structure. The wing frame 136 is located inside the wing housing 130. The wing frame 136 is provided in a Caesars structure and is provided in the structure in which the length thereof varies to correspond to the wing housing 130. The one end of the wing frame 136 may be coupled to the body 10, and the opposite end of the wing frame 136 may be coupled to the inner end of the wing housing 130 away from the body 10.

Figure 12:
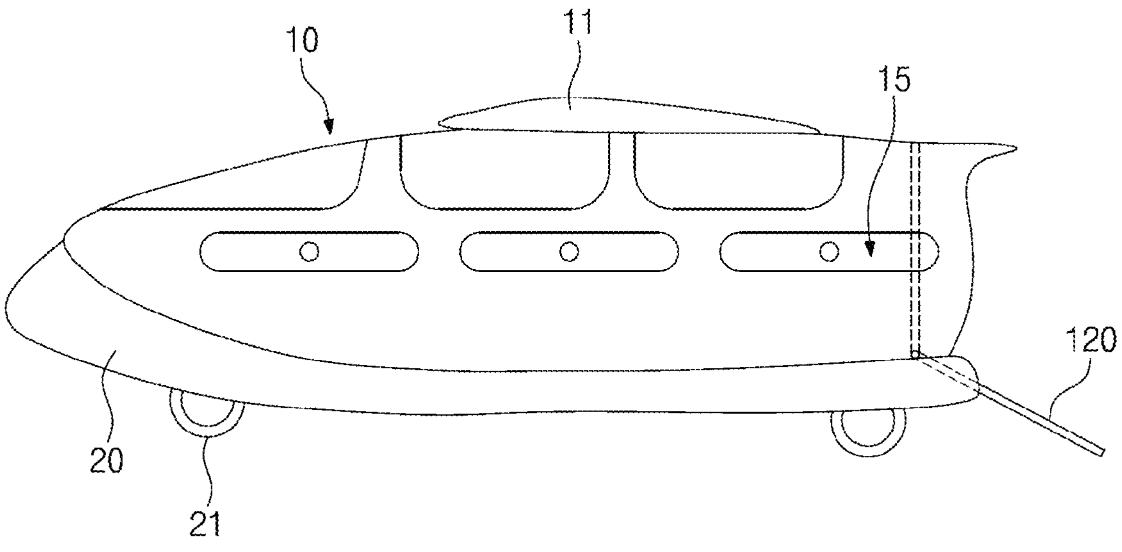
FIG. 12 is a view illustrating a flying car capable of vertical takeoff and landing on the ground/water according to another embodiment.

FIG. 12 is a view illustrating a flying car capable of vertical takeoff and landing on the ground/water according to another embodiment.

Referring to FIG. 12, the flying car 1 capable of vertical takeoff and landing on the ground/water according to another embodiment includes the body 10, the propulsion module 15, and the buoyancy boat 20.

The body 10 forms a boarding space which has a preset volume and which the user may board. Further, the boarding space provided inside the body 10 may form a spare space in which the user may rest after items are loaded or bedding is unfolded while the user is boarded. The outer shape of the body 10 may be provided in a streamlined structure to facilitate flight and reduce friction during the flight.

The main wing 11 for the flight is provided outside the body 10. The main wing 11 is provided in a structure as illustrated in FIGS. 8 to 11 and is provided to have a variable length.

The propulsion module 15 is connected to the body 10 and is provided to form a propulsive force for the flight. The propulsion modules 15 are located on a left side and a right side of the body 10. The propulsion modules 15 may be located symmetrical to each other in a front-rear direction on the left side and the right side of the body 10. The plurality of propulsion modules 15 may be provided to be spaced apart from each other in the front-rear direction.

The rear door 120 is provided at the rear end portion of the body 10 for the body 10 to be opened. A lower end portion of the rear door 120 is provided to be rotatable in the left-right direction with respect to the body 10. Accordingly, when the rear door 120 is opened and an upper portion thereof is then lowered toward the ground, the rear door 120 functions as an inclined board used for disabled persons to board or to load or unload items. Further, a contact portion of a vertical tail wing 13 provided in a flight assistance module 30, which will be described below, when the rear door 120 is lowered toward the ground, may be recessed in the rear door 120 to minimize interference.

Figure 13:
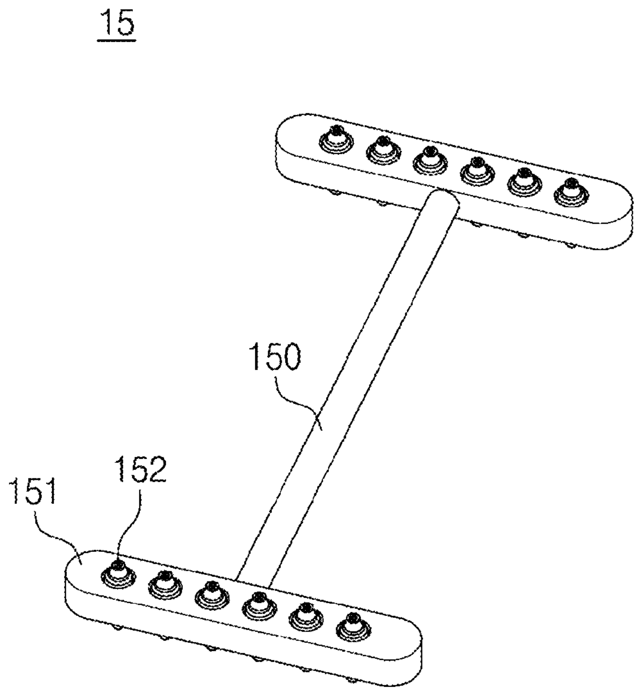
FIG. 13 is a view illustrating a propulsion module.

FIG. 13 is a view illustrating a propulsion module.

Referring to FIG. 13, the propulsion module 15 includes a support shaft 150, a connection member 151, and a propulsion member 152.

The support shaft 150 is provided to be connected to the body 10. In this case, the support shaft 150 may be provided to pass through the body 10 in a width direction, and thus opposite ends thereof may be provided to be located outside the body 10 in the left-right direction.

As another example, one end of the support shaft 150 may be connected to the body 10 and provided to extend outward from the body 10 in the width direction. The support shaft 150 is provided to be rotatable about a longitudinal direction thereof with respect to the body 10.

Further, when the plurality of propulsion modules 15 are provided in the front-rear direction, the support shafts 150 of the propulsion modules 15 may be provided to be rotatable with respect to the body 10 in conjunction with each other. As an example, sprockets may be provided on an outer perimeter of the support shaft 150 provided in the front-rear direction, and the sprockets may be connected to a chain. Further, when the chain rotates by a driving member, the sprocket and the support shaft 150 coupled thereto may rotate according to the rotation.

The connection member 151 is located at an end portion of the support shaft 150, which is located outside the body 10. That is, when the support shaft 150 is located to pass through the body 10 in the width direction, the connection members 151 are located at opposite ends of the support shaft 150. Further, when one end of the support shaft 150 is provided to be connected to the body 10, the connection member 151 is located at an end of the body 10, which extends outward. FIG. 10 illustrates a case in which the connection members 151 are located at opposite ends of the support shaft 150 when the support shaft 150 is located to pass through the body 10 in the width direction. The connection member 151 is provided to have a preset length in a direction perpendicular to the support shaft 150. The connecting member 151 has a curved front surface and a curved rear surface to minimize air resistance.

The propulsion member 152 generates a propulsive force. The propulsion member 152 is provided to be coupled to the connection member 151. The propulsion member 152 is provided as a plurality of propulsion members 152 which are arranged in a line in a longitudinal direction of the connection member 151. The propulsion module 152 may be a jet engine, an EDF, or the like. The propulsion module 15 is embodied to be used for a drone and is operated based on drone-type control. FIG. 13 illustrates a case in which the propulsion member 152 is provided as a jet engine.

Figure 14:
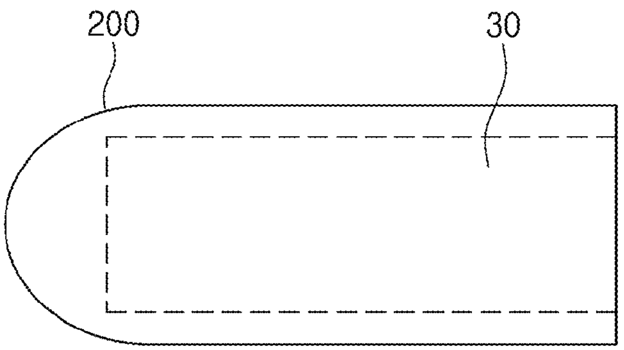
FIG. 14 is a view illustrating a structure of the buoyancy boat on a plane.
Figure 15:
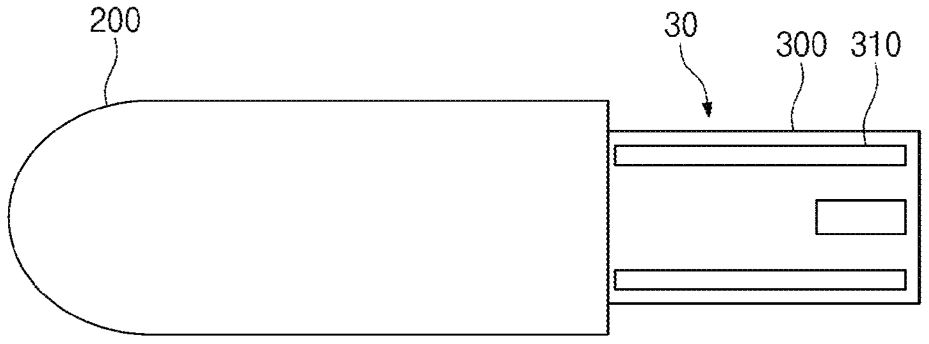
FIG. 15 is a view illustrating a state in which a flight assistance module is withdrawn rearward from the buoyancy boat.

FIG. 14 is a view illustrating a structure of the buoyancy boat on a plane, and FIG. 15 is a view illustrating a state in which a flight assistance module is withdrawn rearward from the buoyancy boat.

Referring to FIGS. 14 and 15, the buoyancy boat 20 is provided to be connected to a lower portion of the body 10 and provides a buoyant force by which the flying car 1 floats on the water. The buoyancy boat 20 may be provided to be symmetrical to the left side and the right side of the body 10. A space in which the flight assistance module 30 may be accommodated is formed inward at a rear end of the buoyancy boat 20.

The flight assistance module 30 includes an auxiliary body part 300 and a rail 310. The auxiliary body part 300 has a preset length in the front-rear direction, has a preset width in the left-right direction, and is provided to be withdrawn to a rear side of the buoyancy boat 20. The flight assistance module 30 is provided in a solid air tube mat structure having sufficient rigidity. Accordingly, the flight assistance module 30 provides a sufficient buoyant force on the water surface. The auxiliary body part 300 may be made of carbon fiber.

The rails 310 are located on both a left side and a right side of an upper surface of the auxiliary body part 300 and are provided to be located from a front end to a rear end of the auxiliary body part 300.

The horizontal tail wing 12 may be provided in the auxiliary body part 300. The horizontal tail wings 12 are located on both a left side and a right side of the rear end of the auxiliary body part 300. The horizontal tail wing 12 is provided in the structure as illustrated in FIGS. 8 to 11, has a variable length, and thus is provided to be accommodated inside the auxiliary body part 300 or to be withdrawn to the outside of the auxiliary body part 300. Further, the vertical tail wing 13 may be provided in a center of the rear end of the auxiliary body part 300. The vertical tail wing 13 may be provided in the structure as illustrated in FIGS. 8 to 11 and may have a variable length.

A hinge core **13*b* may be provided to protrude from a lower portion of the rear end of the auxiliary body part 300. A vertical height of the hinge core 13*b* may be adjusted. The hinge core 13*b* may be connected to a rudder of the vertical tail wing 13. A lower end of the hinge core 13*b* is placed on the ground to support the auxiliary body part 300**.

The flight assistance module 30 may be provided in a solid air tube mat structure having sufficient rigidity to support forces applied to the horizontal tail wing 12 and the vertical tail wing 13.

When the flying car 1 capable of vertical takeoff and landing on the ground/water according to the embodiment of the present invention is located on the water surface, the flying car 1 may stably float by the buoyant force provided by the buoyancy boat 20. Further, when the propulsion member 152 generates a propulsive force in a state in which the connection member 151 is rotated to face the vertical direction, the flying car 1 may travel on the water surface. In this case, the flight assistance module 30 may be provided to be withdrawn to the rear side of the buoyancy boat 20, thereby improving posture stability. Further, the rudder of the vertical tail wing 13 may be provided such that at least a portion thereof is submerged in the water surface, may perform a function thereof even when traveling on the water surface, and thus may effectively change a direction thereof.

The wheels 21 may be located under the buoyancy boat 20. The wheels 21 may be located in the lower front area and the rear area of the buoyancy boat 20. For example, the wheels 21 may be provided as a three-wheel type or a four-wheel type. At least one of the wheels 21 may be provided in the structure in which the in-wheel motor that provides the power for the traveling is embedded. Accordingly, the flying car 1 capable of vertical takeoff and landing on the ground/water according to the embodiment of the present invention may travel through the wheels 21 while located on the ground. Further, the wheels 21 are provided in a sufficient waterproof structure, and thus the flying car 1 capable of vertical takeoff and landing on the ground/water may be parked on the water.

Figure 16:
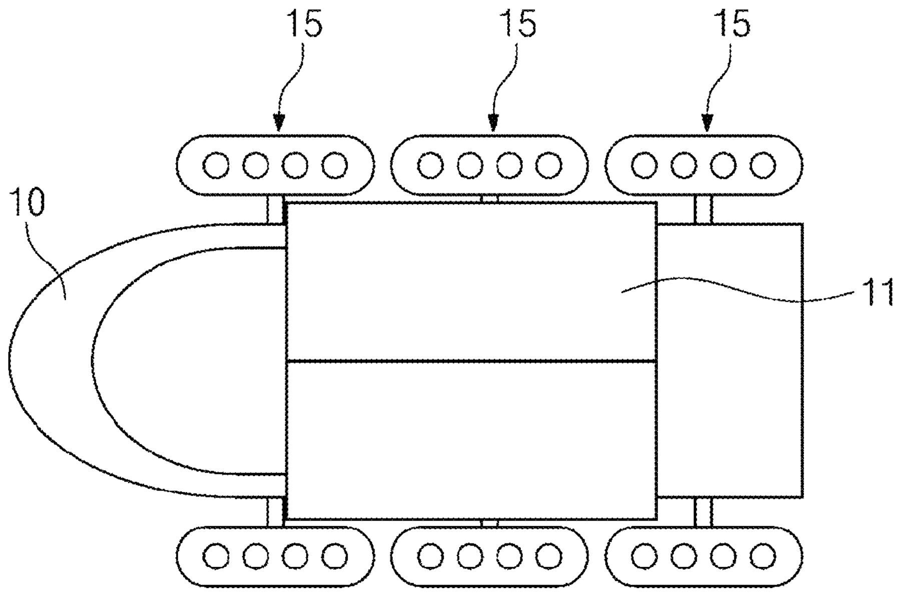
FIG. 16 is a plan view illustrating a state when the flying car capable of vertical takeoff and landing on the ground/water takes off.

FIG. 16 is a plan view illustrating a state when the flying car capable of vertical takeoff and landing on the ground/water takes off.

Referring to FIG. 16, the flying car 1 capable of vertical takeoff and landing on the ground/water may take off when the propulsion member 152 generates a propulsive force while the connection member 151 of the propulsion module 15 faces the front-rear direction. Since the propulsive force generated by the propulsion member 152 faces an upper side, the flying car 1 may take off vertically.

Unlike this, the flying car 10 may take off while a front area of the connection member 151 in the front-rear direction inclined downward at an acute angle. In this case, since the propulsive force generated by the propulsion member 152 faces a front upper side, the flying car 1 may take off to the front upper side. When the takeoff is performed, a length of the main wing 11 may remain minimized. Further, the flight assistance module 30 may be positioned inside the buoyancy boat 20.

Further, landing may be performed in a state in which a posture as illustrated in FIG. 16 is maintained. An operation during the landing is the same as an operation during the takeoff except for a magnitude of the propulsive force by the propulsion member 152.

Figure 17:
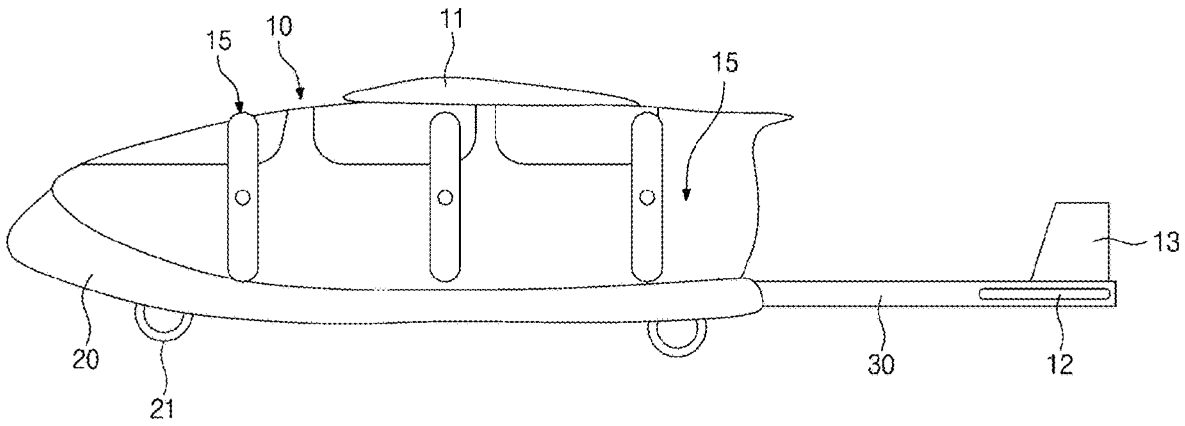
FIG. 17 is a side view of a state of preparing for flight after the takeoff.
Figure 18:
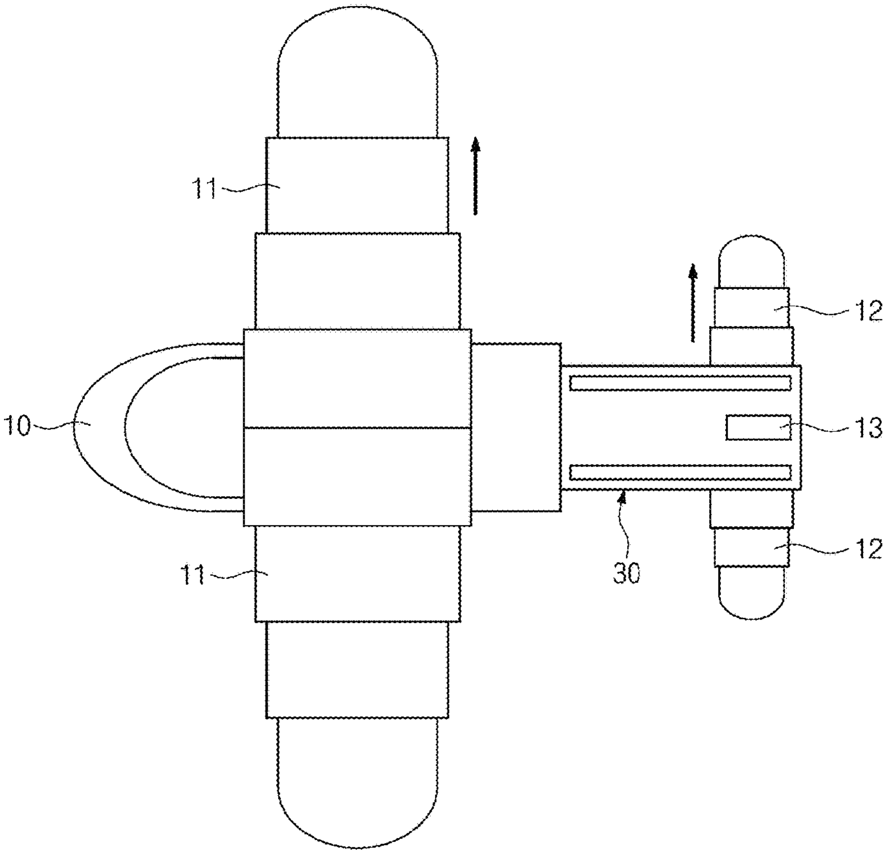
FIG. 18 is a plan view of the state of preparing for the flight after the takeoff.

FIG. 17 is a side view of a state of preparing for flight after the takeoff, and FIG. 18 is a plan view of the state of preparing for the flight after the takeoff.

Referring to FIGS. 17 and 18, when the flying car 1 reaches a target altitude after the takeoff, the flight assistance module 30 is withdrawn from the buoyancy boat 20 toward a rear side. Further, the lengths of the main wing 11 and the horizontal tail wing 12 increase. For example, the length is a maximum length. Further, the propulsion module 15 rotates, the longitudinal direction of the connection member 151 faces the vertical direction, and the propulsive force provided by the propulsion member 152 faces a front side. Accordingly, the flying car 1 capable of vertical takeoff and landing on the ground/water may fly through the propulsive force and direction control provided by the propulsion module 15.

Further, the propulsion module 15 may be provided such that the longitudinal direction of the connection member 151 is inclined at an acute angle with respect to the vertical direction. In this case, the propulsive force provided by the propulsion member 152 is provided to be inclined upward or downward at an acute angle with respect to the front side, so that a flight direction may be adjusted.

In contrast to FIGS. 17 and 18, when the landing is prepared for, the lengths of the wings 11 and 12 are shortened, and the propulsion module 15 is rotated such that the longitudinal direction of the connection member 151 faces the front-rear direction. Further, the flight assistance module 30 is inserted into and accommodated in the buoyancy boat 20, and thus the flying car 1 may be changed to a state as illustrated in FIG. 16.

Figure 19:
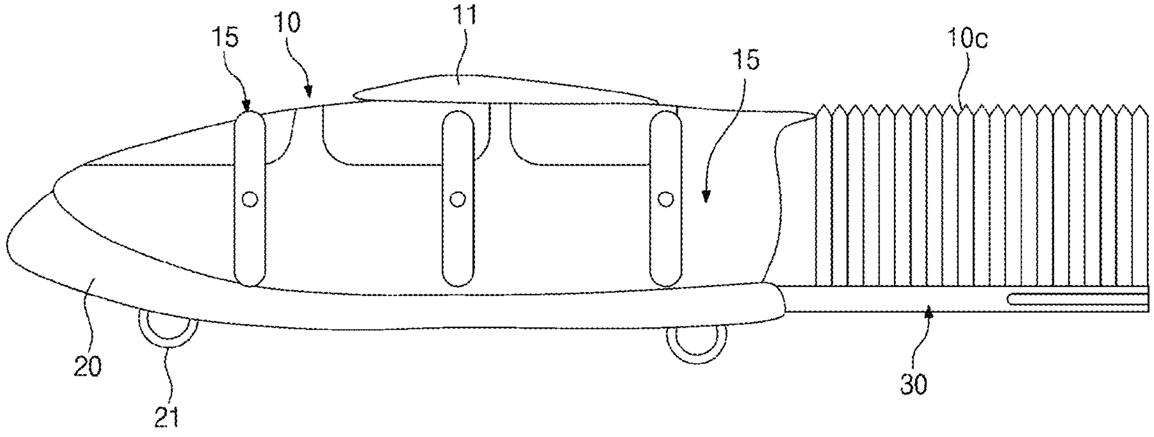
FIG. 19 is a view illustrating a state in which the flight assistance module is covered by a tent member.

FIG. 19 is a view illustrating a state in which the flight assistance module is covered by a tent member.

Referring to FIG. 19, when the flying car 1 is used in a landed state on the water or on the ground, the flight assistance module 30 may be covered with a tent member 10*c* and used. As an example, in the landed state, the flight assistance module 30 may be first withdrawn rearward from the buoyancy boat 20.

The tent member 10*c* may be stored inside the body 10 and may be withdrawn to the rear side of the body 10 as needed to cover the flight assistance module 30. The tent member 10*c* may be provided in a structure in which a length may be expanded or contracted, such as a bellows structure, and a lower end thereof may be provided to be movable along the rail 310. Accordingly, a space formed under the tent member 10*c* is a space that the user may use for camping or the like.

The flying car 1 capable of vertical takeoff and landing on the ground/water according to the present invention uses a jet engine, an EDF, or the like employed and used for drones, and the propulsion module 15 is provided to be operated based on drone-type control. Accordingly, in the case of the airplane according to the related art, it is difficult for the general public to control the airplane because the airplane is equipped with complex instrument panels and control sticks for control, but the flying car 1 capable of vertical takeoff and landing on the ground/water according to the present invention may be controlled when the user is familiar with a drone controlling method.

Further, the flying car 1 capable of vertical takeoff and landing on the ground/water according to the present invention may be provided to be operated manually by the occupant and remotely by a remote controller. Further, a controller of the flying car 1 capable of vertical takeoff and landing on the ground/water according to the present invention may be provided to include autonomous driving software and thus provided to be autonomously driven.

Further, the flying car 1 capable of vertical takeoff and landing on the ground/water according to the present invention may use a jet engine, an EDF, or the like employed and used for drones, have the foldable wings 11 and 12, and thus be parked or stored in a space in which the airplane according to the related art cannot be stored.

Further, in order to achieve convenience when a door of the flying car is opened or closed or to balance a weight of the body, a plurality of H-shaped drones and the main wings 11 and 12 that are expanded and contracted may be installed such that heights thereof are moved in the vertical direction and the front-rear direction unlike the drawings. The H-shaped drones that interfere with opening or closing of the door of the flying car are lifted to an uppermost layer of the body, and the main wings in contact with directional rotation of the drones due to the lifting are lowered and are placed on a boat that is a bottom part of the body. In this case, central frames of the H drones, which may limit space utilization inside the body, are located at a body ceiling, making it easier to utilize the space inside the body. In an embodiment, the reason why the main wings are located on an upper side is that, when the flying car flies low above the sea, an appropriate space is provided between the main wings and the sea water, much air is held, and thus several times as much lift is obtained using small energy costs like a WIG ship.

Although the present invention has been described above in detail using the exemplary embodiments, the scope of the present invention is not limited to specific embodiments and should be interpreted according to the appended claims. Further, those skilled in the art should understand that many modifications and changes may be made without departing from the scope of the present invention.

INDUSTRIAL APPLICABILITY

The flying car capable of vertical takeoff and landing on the ground/water according to the present invention may be used as a manned airplane.

The invention claimed is:

1. A flying car capable of vertical takeoff and landing on ground/water, the flying car comprising:

a body having a preset volume;

a wing provided outside the body;

a propulsion module connected to the body and provided to form a propulsive force for flight;

a buoyancy boat connected to a lower portion of the body and configured to provide a buoyant force by which the flying car floats on the water; and a flight assistance module accommodated in a space formed inward at a rear end of the buoyancy boat and configured to be withdrawn rearward, wherein the propulsion module is provided to be operated based on drone-type control, wherein the flight assistance module is configured to be withdrawn rearward from the buoyancy boat when the flying car is in a landed state, and wherein the flight assistance module is configured to be covered by a tent member when the flight assistance module is in a withdrawn state.

2. The flying car of claim 1, wherein the wing has a variable length.

* * * * *